United States Patent
Lopinti et al.

(10) Patent No.: US 11,149,223 B2
(45) Date of Patent: Oct. 19, 2021

(54) LUBRICITY AND CONDUCTIVITY IMPROVER ADDITIVE FOR ULTRA LOW SULFUR DIESEL FUELS

(71) Applicant: Indian Oil Corporation Limited, Mumbai (IN)

(72) Inventors: Krishnarao Lopinti, Faridabad (IN); Maya Chakradhar, Faridabad (IN); Ajay Kumar Arora, Faridabad (IN); Vivekanand Kagdiyal, Faridabad (IN); Deepak Saxena, Faridabad (IN); Sanjiv Kumar Mazumdar, Faridabad (IN); Sankara Sri Venkata Ramakumar, Faridabad (IN)

(73) Assignee: INDIAN OIL CORPORATION LIMITED, Mumbai (IN)

( * ) Notice: Subject to any disclaimer, the term of this patent is extended or adjusted under 35 U.S.C. 154(b) by 0 days.

(21) Appl. No.: 17/115,343

(22) Filed: Dec. 8, 2020

(65) Prior Publication Data
US 2021/0189270 A1    Jun. 24, 2021

(30) Foreign Application Priority Data
Dec. 20, 2019   (IN) .............................. 201921053214

(51) Int. Cl.
*C10L 1/24* (2006.01)
*C10L 10/18* (2006.01)
(Continued)

(52) U.S. Cl.
CPC ................. *C10L 1/24* (2013.01); *C08K 5/09* (2013.01); *C08K 5/103* (2013.01); *C08K 5/42* (2013.01);
(Continued)

(58) Field of Classification Search
CPC .... C10L 1/24; C10L 10/18; C10L 1/18; C10L 1/22; C10L 10/08; C10L 1/2437; C10L 2200/0446; C10L 2270/026; C10L 2290/24; C10L 2290/06; C10L 2230/20; C10L 1/1881; C10L 1/1883; C10L 1/2475; C10L 1/2383; C10L 1/1832; C10L 1/2431;
(Continued)

(56) References Cited

U.S. PATENT DOCUMENTS 6,793,695 B2    9/2004  Wilkes et al.
8,821,594 B2    9/2014  Burgazli et al.

FOREIGN PATENT DOCUMENTS

EP    1568756 A1    8/2005
WO    2016/022773 A1    2/2016

*Primary Examiner* — Pamela H Weiss
(74) *Attorney, Agent, or Firm* — Workman Nydegger

(57) ABSTRACT

The present invention discloses a single package additive for improving lubricity and conductivity properties of ultra-low sulfur diesel fuels. The single package additive is a reaction product of a fatty acid composition, a glycerol tricarboxylates, a polysulfone, a polyamine, an alkylated benzene sulfonic acid and a phenol derivative. More specifically, the present invention discloses a reaction product of: a fatty acid composition in the range of 60-95% wt/wt; a glycerol tricarboxylate in the range of 0.1-10.0% wt/wt; a polysulfone in the range of 0.1-5.0% wt/wt; a polyamine in the range of 0.1-5.0% wt/wt; an alkylated benzene sulfonic acid in the range of 0.1-5.0% wt/wt; and a phenol derivative in the range of 0.1-10.0% wt/wt. The present invention also discloses a single-pot process for the preparation of said reaction product.

15 Claims, 1 Drawing Sheet

(51) Int. Cl.
*C10L 1/18* (2006.01)
*C10L 1/22* (2006.01)
*C10L 10/08* (2006.01)
*C08L 81/06* (2006.01)
*C08K 5/09* (2006.01)
*C08L 79/02* (2006.01)
*C08K 5/103* (2006.01)
*C08K 5/42* (2006.01)
*C10L 1/188* (2006.01)
*C10L 1/2383* (2006.01)

(52) U.S. Cl.
CPC ............... *C08L 79/02* (2013.01); *C08L 81/06* (2013.01); *C10L 1/18* (2013.01); *C10L 1/22* (2013.01); *C10L 10/08* (2013.01); *C10L 10/18* (2013.01); *C10L 1/1881* (2013.01); *C10L 1/1883* (2013.01); *C10L 1/2383* (2013.01); *C10L 1/2437* (2013.01); *C10L 1/2475* (2013.01); *C10L 2200/0446* (2013.01); *C10L 2230/20* (2013.01); *C10L 2270/026* (2013.01); *C10L 2290/06* (2013.01); *C10L 2290/24* (2013.01)

(58) Field of Classification Search
CPC ........ C10L 1/2222; C10L 1/191; C10L 1/143; C08L 81/06; C08L 79/02; C08K 5/09; C08K 5/103; C08K 5/42; C08G 73/0226
See application file for complete search history.

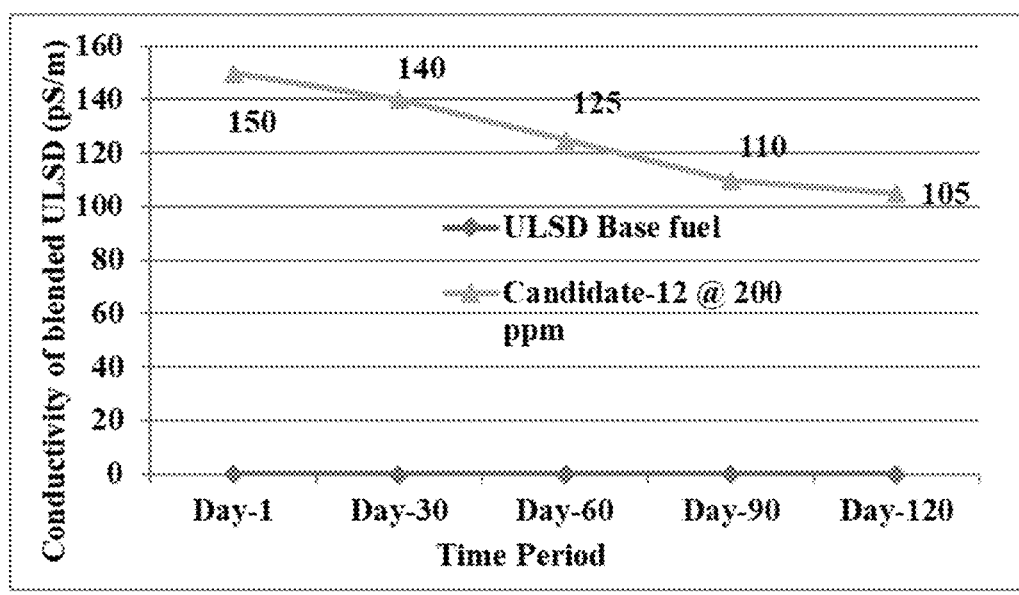

LUBRICITY AND CONDUCTIVITY IMPROVER ADDITIVE FOR ULTRA LOW SULFUR DIESEL FUELS

FIELD OF THE INVENTION

The present invention provides a single package additive for improving lubricity and conductivity properties of ultra-low sulfur diesel fuels. More specifically, the present invention discloses a reaction product of: a fatty acid composition in the range of 60-95% wt/wt; a glycerol tricarboxylate in the range of 0.1-10.0% wt/wt; a polysulfone in the range of 0.1-5.0% wt/wt; a polyamine in the range of 0.1-5.0% wt/wt; an alkylated benzene sulfonic acid in the range of 0.1-5.0% wt/wt; and a phenol derivative in the range of 0.1-10.0% wt/wt. The present invention also discloses a single-pot process for the preparation of said reaction product.

BACKGROUND OF THE INVENTION

Introduction of ultra-low sulfur diesel (ULSD) fuels in to transportation sector is essential in view of environmental concerns on sulfur levels in the atmosphere however the secondary processes used for production of ultra-low sulfur diesel are affecting fuel properties like lubricity and conductivity. Recently some incidents were reported on explosions during transportation and handling of diesel fuels. This is due to lack of electrostatic conductivity in the fuel. ULSD fuels also have poor lubricity due to loss of polar compounds during hydro-treating and poor lubricity results in wear problem. To address this concern lubricity additive are added to ULSD fuels. However, lubricity improvers can only improve the lubricity of the ULSD along with it, static dissipation additives are also required for safe handling and transportation of diesel.

In literature, several patents have been published on lubricity improver additives and antistatic additives for fuels. However, the additive application has been reported separately. Due to highly requirement of low sulfur fuels, researchers started focus on development of lubricity and antistatic additive packages for low sulfur fuels. Very few patents were found on development of packages having property to enhance both lubricity and conductivity. Some patents/applications from different groups have been published on development of mixture packages of lubricity improvers and conductivity improving additives.

Amongst, U.S. Pat. No. 6,793,695 B2 was published by The Lubrizol Corporation in 2004 about development of anti-static lubricity additive for ultralow sulfur diesel by using mixture of combination of different commercial lubricity improvers and antistatic additives available in the market. The lubricity additives used in this patent is mainly tall oil fatty acid (TOFA) based composition, whereas antistatic additives are commercially available in the brand name of Tolad™ 3511 and Tolad™ 3512. Amongst these combinations, only one composition blended in ULSD is giving low wear scar diameter in HFRR test whereas conductivity of this fuel is very poor even at 204 ppm dosage. In this patent, there was no information about sustainability of conductivity and lubricity with respect to time and compatibility issues.

Another patent U.S. Pat. No. 8,821,594 B2 on synergistic composition for petroleum fuels was published by Innospec Fuel Specialties LLC in 2014. This patent disclosed the performance of combination of six different commercial lubricity improvers from different manufacturers with commercially available antistatic additives Stadis® 450 and Stadis® 425. The study also summarized the effect of antistatic additives doped at low dosage in combination of lubricity improvers at different dosages (50-200 ppm) in ULSD fuel. The synergistic improvement of conductivity of ULSD was published which is notably low and in combination of few lubricity improvers. The study of wear scar diameter measurement by HFRR test was not reported and also the change in conductivity of fuel of these blends has also not published in the patent stated.

EP1568756A1 disclosed a fuel oil containing a conductivity improving additive comprising the combination of: (a) an oil soluble succinimide dispersant comprising a functionalized hydrocarbon reacted with an alkylene polyamine and (b) a conductivity improver comprising (i) an olefin polysulfone and (ii) a polymeric polyamine reaction product of epichlorohydrin and an aliphatic primary monoamine or an N-aliphatic hydrocarbyl alkylene diamine, or the sulfonic acid salt of the polymeric polyamine reaction product or (c) the combination of an oil soluble succinimide dispersant comprising a functionalized hydrocarbon reacted with a heavy polyamine and (d) a conductivity improver comprising a hydrocarbon soluble copolymer of an alkylvinyl monomer and a cationic vinyl monomer, wherein the copolymer has an alkylvinyl monomer unit to cationic vinyl monomer unit ratio of from about 1:1 to about 10:1, the copolymer having an average molecular weight of from about 800 to about 1,000,000.

WO2016022773A1 discloses an extreme pressure additive package formulated with a biodegradable sulfur component, which additive package can achieve suitable extreme pressure performance when formulated into a fully formulated industrial gear oil lubricant.

The following are the shortcomings of the prior art additives/processes:
- Lack of single novel additive package for improving both lubricity and conductivity of low sulfur diesel (ULSD) fuels;
- Lack of simple preparation procedure;
- Lack of availability of stable additive package having compatibility of components with each other;
- Lack of consistency in performance of developed additive package in ULSD fuels.

In view of said shortcomings, there is a need of a single package additive for improving both lubricity and conductivity of low sulfur diesel (ULSD) fuels. Moreover, there is a need for a multifunctional diesel fuel additive package that when stored does not lose the ability to deliver conductivity to the fuel in addition to improved lubricity.

The present invention addresses the deficiencies of the prior art and the current and future requirements associated with ULSD. The present invention provides a single package additive for improving lubricity and conductivity properties of ultra-low sulfur diesel fuels.

OBJECTIVES OF THE PRESENT INVENTION

The main objective of the present invention is to provide a single package additive to reduce the requirement of dosing of lubricity improver and conductivity improver separately in ULSD fuels.

Another objective of the present invention is to provide a process which uses cost-effective phenol derivatives to provide required stability to additive package for improvement of lubricity and conductivity of ULSD fuels without affecting other properties of fuels.

Still another objective of the present invention is to provide improved performance in addressing lubricity and conductivity issues of ULSD fuels.

SUMMARY OF THE INVENTION

In an aspect of the present invention, the present invention discloses a reaction product of: a fatty acid composition in the range of 60-95% wt/wt; a glycerol tricarboxylate in the range of 0.1-10.0% wt/wt; a polysulfone in the range of 0.1-5.0% wt/wt; a polyamine in the range of 0.1-5.0% wt/wt; an alkylated benzene sulfonic acid in the range of 0.1-5.0% wt/wt; and a phenol derivative in the range of 0.1-10.0% wt/wt.

In another aspect of the present invention, the present invention discloses a process for the preparation of a reaction product, comprising the steps of: i) stirring a fatty acid composition containing a mixture of fatty acids of carbon atoms $C_{12-24}$ in the range of 60-95% wt/wt at 25-30° C.; ii) adding a glycerol carboxylate in the range of 1.0-10.0% wt/wt at 25° C.-30° C. in 30 minutes under continuous stirring; iii) adding phenol derivative compound in the range of 1.0-10.0% wt/wt at 25-30° C. under continuous stirring and continue the stirring for another 20 minutes; iv) heating the above reaction mixture at 50° C. and stirring continued for one hour; v) adding a mixture of polysulfone in the range of 0.1-5.0% wt/wt, polyamine mixture in the range of 0.1-5.0% wt/wt, and alkylated benzene sulfonic acid in the range of 0.1-5.0% wt/wt, prepared in diluent in the range of 0.5-5.0% wt/wt to the reaction mass obtained in step iv); vi) i) heating and stirring the mixture obtained after step v) at 50° C. to obtain the reaction product.

In an embodiment of the present invention, the fatty acid composition is a mixture of fatty acids having carbon atoms in the range of $C_{12}$-$C_{24}$, wherein the fatty acid is selected from a group consisting of lauric acid, stearic acid, oleic acid, linoleic acid, myristoleic acid, behenic acid and arachidonic acid.

In an embodiment of the present invention, the glycerol tricarboxylate is prepared by reacting glycerol with fatty acid, and the fatty acid is selected from a group consisting of lauric acid, palmitic acid, linoleic acid, ricinoleic acid, and any mixture thereof.

In an embodiment of the present invention, the polysulfone is a reaction product of 1-alkene and $SO_2$ in the ratio of 1:1, and having molecular weight 10000-100000 gm/mole measured by gel permeation chromatography (GPC).

In an embodiment of the present invention, the polyamine is a condensed product of an epichlorohydrin and an alkylamine, wherein the alkylamine is having carbon atoms in the range of $C_{12}$ to $C_{18}$.

In an embodiment of the present invention, the alkylated benzene sulfonic acid is a mixture of linear, iso and tertiary alkyl groups of carbon atom ranging from $C_{10}$-$C_{18}$.

In an embodiment of the present invention, the phenol derivative having Formula-I:

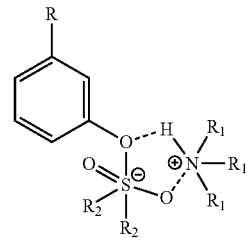

Formula I wherein,
R=alkyl or alkenyl group having carbon chain length of $C_{15}$-$C_{20}$;
$R_1$=alkyl or alkenyl group having carbon chain length of $C_{12}$-$C_{18}$; and
$R_2$=alkyl or alkenyl group having carbon chain length of $C_8$-$C_{12}$.

In an embodiment of the present invention, the reaction product is used as additive for improving lubricity and conductivity properties of ultra-low sulfur diesel (ULSD) having sulfur quantity below 10 ppm (ASTM D5453-19a).

In an embodiment of the present invention, the diluent is a composition of several aromatic chemical compounds like benzene, toluene, xylene and other aromatic chemical derivatives.

BRIEF DESCRIPTION OF THE DRAWING

FIG. 1 illustrates conductivity performance of Candidate 12 blended ULSD fuels with time.

DETAILED DESCRIPTION OF THE INVENTION

While the invention is susceptible to various modifications and/or alternative processes and/or compositions, specific embodiment thereof has been shown by way of example in tables and will be described in detail below. It should be understood, however that it is not intended to limit the invention to the particular processes and/or product/compositions disclosed, but on the contrary, the invention is to cover all modifications, equivalents, and alternatives falling within the spirit and the scope of the invention as defined by the appended claims.

The tables and protocols have been represented where appropriate by conventional representations, showing only those specific details that are pertinent to understanding the embodiments of the present invention so as not to obscure the disclosure with details that will be readily apparent to those of ordinary skill in the art having benefit of the description herein.

The following description is of exemplary embodiments only and is not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention.

Any particular and all details set forth herein are used in the context of some embodiments and therefore should not be necessarily taken as limiting factors to the attached claims. The attached claims and their legal equivalents can be realized in the context of embodiments other than the ones used as illustrative examples in the description below.

Accordingly, the present invention discloses a single additive package for improving lubricity and conductivity properties of ultra-low sulfur diesel fuels which is the reaction product of fatty acid composition (60-95% wt/wt), glycerol triocarboxyalates (0.1-10.0% wt/wt), polysulfone (0.1-5.0% wt/wt), polyamine (0.1-5.0% wt/wt), aromatic benzene sulfonic acid (0.1-5.0% wt/wt) and phenol derivatives (0.1-10.0% wt/wt) having structure as defined in FIG. 1.

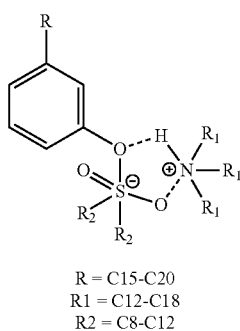

R = C15-C20
R1 = C12-C18
R2 = C8-C12

In one of the detailed features, the present invention covers the single additive package for ultra-low sulfur diesel (ULSD) which is having sulfur quantity below 10 ppm (ASTM D 5453). Ultra-low sulfur diesel fuel is produced in refineries through different hydrogen treating processes.

Fatty Acid Composition:

In this invention, fatty acids composition has fatty acids containing carbon $C_{12}$-$C_{24}$ was purchased from local vendors/suppliers of India.

Glycerol Carboxylate Mixture:

Mixture of glycerol carboxylates of different fatty acids namely lauric, palmitic, linoleic, ricinoleic etc. has been prepared from esterification of glycerol with fatty acids as per literature procedure and used in the active formulation as a mixture of glycerol carboxylate of fatty acids.

Phenol Derivative Compound:

Phenol derivative compound (alkyl group with $C_{15-20}$) was purchased from commercial suppliers in India.

Linear Alkyl Polysulfone:

Polysulfone is co-polymer of 1-alkene and $SO_2$ in the ratio of 1:1 and of polymer with molecular weight 10000-100000 has been used was synthesized in the laboratory. The 1-alkenes of carbon chain $C_8$-$C_{12}$ have been used in the preparation of corresponding polysulfones. Different polysulfones synthesized from 1-olefins ($C_8$-$C_{12}$) and $SO_2$ as described in the patent U.S. Pat. No. 3,917,466 (1975). The synthesized co-polymer compounds were well characterized by different analytical techniques like IR, NMR and GPC.

Alkylated Benzene Sulfonic Acid Mixture:

Alkylated benzene sulfonic acid is a mixture of different alkyl groups of linear, iso and tertiary of carbon $C_{10}$-$C_{18}$ has been purchased from local vendors/suppliers of India.

Polyamine Mixture:

Polyamine mixture is a condensed product of epichlorohydrin and different alkylamine of carbon C12 to C18 was brought from local suppliers of India.

Diluent (DL) used in this invention is a selective product of refinery obtained from pre-fractionated bottom stream having flash point more than 60° C.

In an aspect of the present invention, the present invention discloses a reaction product of: a fatty acid composition in the range of 60-95% wt/wt; a glycerol tricarboxylate in the range of 0.1-10.0% wt/wt; a polysulfone in the range of 0.1-5.0% wt/wt; a polyamine in the range of 0.1-5.0% wt/wt; an alkylated benzene sulfonic acid in the range of 0.1-5.0% wt/wt; and a phenol derivative in the range of 0.1-10.0% wt/wt.

In another aspect of the present invention, the present invention discloses a process for the preparation of a reaction product, comprising the steps of: i) stirring a fatty acid composition containing a mixture of fatty acids of carbon atoms $C_{12-24}$ in the range of 60-95% wt/wt at 25-30° C.; ii) adding a glycerol carboxylate in the range of 1.0-10.0% wt/wt at 25° C.-30° C. in 30 minutes under continuous stirring; iii) adding phenol derivative compound in the range of 1.0-10.0% wt/wt at 25-30° C. under continuous stirring and continue the stirring for another 20 minutes; iv) heating the above reaction mixture at 50° C. and stirring continued for one hour; v) adding a mixture of polysulfone in the range of 0.1-5.0% wt/wt, polyamine mixture in the range of 0.1-5.0% wt/wt, and alkylated benzene sulfonic acid in the range of 0.1-5.0% wt/wt, prepared in diluent in the range of 0.5-5.0% wt/wt to the reaction mass obtained in step iv); vi) i) heating and stirring the mixture obtained after step v) at 50° C. to obtain the reaction product.

In a feature of the present invention, the fatty acid composition is a mixture of fatty acids having carbon atoms in the range of $C_{12}$-$C_{24}$, wherein the fatty acid is selected from a group consisting of lauric acid, stearic acid, oleic acid, linoleic acid, myristoleic acid, behenic acid and arachidonic acid.

In a feature of the present invention, the glycerol tricarboxylate is prepared by reacting glycerol with fatty acid, and the fatty acid is selected from a group consisting of lauric acid, palmitic acid, linoleic acid, ricinoleic acid, and any mixture thereof.

In a feature of the present invention, the polysulfone is a reaction product of 1-alkene and $SO_2$ in the ratio of 1:1, and having molecular weight 10000-100000 gm/mole measured by gel permeation chromatography (GPC).

In a feature of the present invention, the polyamine is a condensed product of an epichlorohydrin and an alkylamine, wherein the alkylamine is having carbon atoms in the range of $C_{12}$ to $C_{18}$.

In a feature of the present invention, the alkylated benzene sulfonic acid is a mixture of linear, iso and tertiary alkyl groups of carbon atom ranging from $C_{10}$-$C_{18}$.

In a feature of the present invention, the phenol derivative having Formula-I:

Formula I

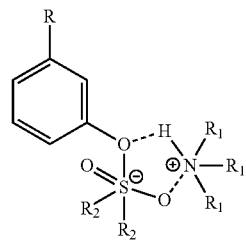

wherein,

R=alkyl or alkenyl group having carbon chain length of $C_{15}$-$C_{20}$;

$R_1$=alkyl or alkenyl group having carbon chain length of $C_{12}$-$C_{18}$; and $R_2$=alkyl or alkenyl group having carbon chain length of $C_8$-$C_{12}$.

In a feature of the present invention, the reaction product is used as additive for improving lubricity and conductivity properties of ultra-low sulfur diesel (ULSD) having sulfur quantity below 10 ppm (ASTM D5453-19a).

In a feature of the present invention, the diluent is a composition of several aromatic chemical compounds like benzene, toluene, xylene and other aromatic chemical derivatives. The other aromatic chemical derivatives is a mixture of aromatic compounds having carbons in the range of C6-C18. Specifically, the diluents are phenol derivative compound(s) and fatty acid(s) composition.

In an aspect of the present invention, the present invention discloses a reaction product of: a fatty acid composition in the range of 60-95% wt/wt; a glycerol tricarboxylate in the range of 0.1-10.0% wt/wt; a polysulfone in the range of 0.1-5.0% wt/wt; a polyamine in the range of 0.1-5.0% wt/wt; an alkylated benzene sulfonic acid in the range of 0.1-5.0% wt/wt; and a phenol derivative in the range of 0.1-10.0% wt/wt; wherein, the fatty acid composition is a mixture of fatty acids having carbon atoms in the range of $C_{12}$-$C_{24}$, wherein the fatty acid is selected from a group consisting of lauric acid, stearic acid, oleic acid, linoleic acid, myristoleic acid, behenic acid and arachidonic acid; wherein the glycerol tricarboxylate is prepared by reacting glycerol with fatty acid, and the fatty acid is selected from a group consisting of lauric acid, palmitic acid, linoleic acid, ricinoleic acid, and any mixture thereof; wherein, the polysulfone is a reaction product of 1-alkene and $SO_2$ in the ratio of 1:1, and having molecular weight 10000-100000 gm/mole measured by gel permeation chromatography (GPC); wherein, the polyamine is a condensed product of an epichlorohydrin and an alkylamine, wherein the alkylamine is having carbon atoms in the range of $C_{12}$ to $C_{18}$; wherein, the alkylated benzene sulfonic acid is a mixture of linear, iso and tertiary alkyl groups of carbon atom ranging from $C_{10}$-$C_{18}$.

The FIG. 1 shows the interaction of phenol derivative with other active components which leads to the formation of a stable and effective formulation. For Example, candidates 1-3 are lacking phenol derivatives, hence they are resulted in unstable formulation with formation of sediments. But later it is found that phenol derivatives added formulations are stable. So, the analytical data confirmed the formation of the structure shown in the FIG. 1 which is proving stability to the formulation.

EXAMPLES

The present invention is exemplified by following non-limiting examples:

Lubricity Cum Antistatic Additive Preparation:

General production procedure: Single-pot preparation procedure has been optimized for the preparation of single package of lubricity cum antistatic additive package for ULSD fuels;

In a clean vessel, take fatty acid composition containing mixture of fatty acids of carbon $C_{12-24}$ (60-95%, wt/wt) and start stirring at 25-30° C. Add glycerol carboxylate mixture (1.0-10.0%, wt/wt) at 25° C.-30° C. in 30 minutes under continuous stirring. After addition of glycerol carboxylate mixture, Phenol derivative compound (1.0-10.0% wt/wt) was added slowly at 25-30° C. and stirring continued for another 20 minutes. The reactor temperature is increased to 50° C. and stirring continued to for one hour to from active component for further use. After one hour of heating, added pre-mixture of polysulfone (0.1-5.0% wt/wt), polyamine mixture (0.1-50% wt/wt) and alkylated benzene sulfonic acid (0.1-5.0% wt/wt) in high flash liquid diluent (DL, 0.5-5.0% wt/wt) collected from refinery.

After one hour of stirring at 50° C., lubricity cum antistatic additive package was collected in to airtight container for storage in quantitative yields. The package prepared was thoroughly characterized by analytical techniques and evaluated for physio-chemical properties.

Stability & Performance Studies:

Lubricity cum antistatic additive compositions prepared in different combinations of active components in different ratios and studied their stability and performance in ultra-low sulfur diesel fuel. Initially, the lubricity cum antistatic additive was prepared with reaction of fatty acid composition, glycerol carboxylate mixture and static dissipating chemicals like polysulfone, polyamine and alkylated benzene sulfonic acids in high flash diluents (DL). Following set of compositions prepared were stored and observed for stability for a period of six months. (Table 1).

TABLE 1

Lubricity cum antistatic additive and stability establishment studies:

Percentages of components in lubricity cum antistatic formulations wt/wt

| Formulation code | Fatty acid | GTO | Poly-sulfone | Poly-amine | Alkylated benzene sulfonic acid | Diluent (DL) | Phenol derivative | Stability |
|---|---|---|---|---|---|---|---|---|
| Candidate 1 | 75 | 5 | 3 | 2 | 3 | 12 | 0 | Unstable |
| Candidate 2 | 85 | 3 | 1.8 | 1.2 | 1.8 | 7.2 | 0 | Unstable |
| Candidate 3 | 95 | 1 | 0.6 | 0.4 | 0.6 | 2.4 | 0 | Unstable |
| Candidate 4 | 85 | 5 | 1 | 0.5 | 0.75 | 2.75 | 5 | Stable |
| Candidate 5 | 85 | 5 | 1.4 | 0.7 | 1.05 | 3.85 | 3 | Stable |
| Candidate 6 | 85 | 5 | 1.8 | 0.9 | 1.35 | 4.95 | 1 | Stable |
| Candidate 7 | 90 | 5 | 0.15 | 0.1 | 0.15 | 0.6 | 4 | Stable |
| Candidate 8 | 90 | 4 | 0.15 | 0.1 | 0.15 | 0.6 | 5 | Stable |
| Candidate 9 | 92 | 3 | 0.3 | 0.2 | 0.3 | 1.2 | 3 | Stable |
| Candidate 10 | 94 | 4 | 0.15 | 0.1 | 0.15 | 0.6 | 1 | Stable |
| Candidate 11 | 95 | 3 | 0.15 | 0.1 | 0.15 | 0.6 | 1 | Stable |
| Candidate 12 | 95 | 2 | 0.15 | 0.1 | 0.15 | 0.6 | 2 | Stable |
| Candidate 13 | 95 | 2 | 0.3 | 0.2 | 0.3 | 1.2 | 1 | Stable |

TABLE 1-continued

Lubricity cum antistatic additive and stability establishment studies:

Percentages of components in lubricity cum antistatic formulations wt/wt

| Formulation code | Fatty acid | GTO | Poly-sulfone | Poly-amine | Alkylated benzene sulfonic acid | Diluent (DL) | Phenol derivative | Stability |
|---|---|---|---|---|---|---|---|---|
| Candidate 14 | 95 | 1 | 0.45 | 0.3 | 0.45 | 1.8 | 1 | Stable |
| Candidate 15 | 95 | 1 | 0.3 | 0.3 | 0.3 | 2.1 | 1 | Stable |
| Candidate 16 | 95 | 1 | 0.6 | 0.6 | 0.6 | 1.2 | 1 | Stable |
| Candidate 17 | 95 | 3 | Hexene 0.15 | 0.1 | 0.15 | 0.6 | 1 | Stable |
| Candidate 18 | 95 | 3 | Dodece 0.15 | 0.1 | 0.15 | 0.6 | 1 | Stable |

The additive formulations Candidate 1, 2 & 3 prepared from fatty acid composition and glycerol tricarboxylate composition (GTO) mixture was incorporated with chemicals like polysulfone prepared from 1-decene and $SO_2$, polyamine and alkylated benzene sulfonic acid in different ratios and it was observed that precipitation was started forming during storage after one week. Hence, the stability of formulations Candidates 1, 2 & 3 is not enough for storage and evaluation for critical properties. Different stabilizing agents were tried in the formulations and amongst phenol derivative compound has shown positive results. Hence, further additive formulations Candidate 4-18 were developed by using stabilizing agent phenol derivative compound. From Candidates 4 to 18 are prepared using different combination of fatty acids, GTO, polysulfone, alkylated benzene sulfonic acid, diluents along with phenol derivative in different proportions (Table 1) and studied the stability and performance in ULSD fuels thoroughly.

Lubricity Performance Study in ULSD Fuel:

The developed stable lubricity cum antistatic formulations namely Candidates 4 to 18 were evaluated in ULSD fuel for lubricity improvement and also conductivity improvement. Performance evaluation of these additive formulations in ULSD fuel performed at different dosage from 100 ppm to 200 ppm. The detailed study of lubricity property of developed formulations Candidates 4-18 evaluated by HFRR test according to ISO12156 method were summarized below.

TABLE 2

Lubricity improvement at different dosages of the developed additive formulations in ULSD fuel

| Additive Formulation | Blended in Fuel type | At 100 ppm dosage | At 150 ppm dosage | At 200 ppm dosage |
|---|---|---|---|---|
| None | ULSD | | 590 | |
| Candidate 4 | ULSD | 565 | 535 | 485 |
| Candidate 5 | ULSD | 570 | 540 | 515 |
| Candidate 6 | ULSD | 580 | 565 | 540 |
| Candidate 7 | ULSD | 530 | 470 | 420 |
| Candidate 8 | ULSD | 535 | 475 | 430 |
| Candidate 9 | ULSD | 520 | 460 | 415 |
| Candidate 10 | ULSD | 525 | 465 | 385 |
| Candidate 11 | ULSD | 530 | 450 | 405 |
| Candidate 12 | ULSD | 525 | 455 | 390 |
| Candidate 13 | ULSD | 530 | 455 | 410 |
| Candidate 14 | ULSD | 545 | 460 | 425 |
| Candidate 15 | ULSD | 535 | 458 | 430 |
| Candidate 16 | ULSD | 540 | 460 | 427 |
| Candidate 17 | ULSD | 530 | 455 | 419 |
| Candidate 18 | ULSD | 535 | 457 | 425 |

The wear scar diameter of ULSD fuel used for testing is having 590 microns of wear scar diameter without adding additives. The developed additive formulations from Candidate 4 to 18 were blended separately in ULSD fuel at different dosages 100 ppm, 150 ppm and 200 ppm. The additive blended ULSD fuel was evaluated under HFRR test following method ISO 12156. As per requirement of Indian standards of diesel fuels the wear scar diameter should be below 460 microns at the time of utilization. To maintain the required wear scar meter, lubricity improvers used to be blended at refinery point before dispatch and maintain the wear scar diameter of the diesel near less than 420 microns.

As per the results of the performance of Candidates 4 to 18 in HFRR test, the improvement of lubricity at 100 ppm dosage all the formulations showed not remarkable change in lubricity from that of basic ULSD fuel or reference diesel fuel. But, much improvement of lubricity of the diesel has been observed with doping of 150 ppm and 200 ppm of the Candidate 9 to 18 individually.

Also, the studies of the performance evaluation of Candidate 9 to 18 in ULSD fuel at 200 ppm gave wear scar diameter in HFRR test much below the required wear scar diameter 460 microns (Lubricity of the ULSD fuel increased).

Hence, further studies were continued with Candidate 9-18 in ULSD fuel. The conductivity studies of these Candidates 9-18 were performed and found an improvement of the conductivity of the ULSD fuel upon dosage ranging from 100 to 200 ppm.

ISO 12156-1:2018 specifies a test method using the high-frequency reciprocating rig (HFRR), for assessing the lubricating property of diesel fuels, including those fuels which may contain a lubricity-enhancing additive. The lubricity of the fuel is measured in terms of wear scar diameter on reciprocating ball (@ 50 Hz per single stroke) under the load of 200 gm and at temperature 60° C. during 75 minutes. The resulting wear scar diameter is measured in microns using digital camera.

Conductivity Performance Studies in ULSD Fuel:

The ULSD fuel has initial conductivity of 0 pS/m and has doped with developed additive formulations from Candidate 9 to 18 at different dosages from 100 to 200 ppm. Conductivity studies of blended ULSD fuels at different dosages performed as per the ASTM method D2624 using conductivity meter. The results were summarized in following table:

TABLE 3

Conductivity studies of the developed additive blended at different dosages (100 ppm to 200 ppm) in ULSD fuel.

| Additive Formulation | Blended in Fuel type | Conductivity as per ASTM D2624 (pS/m) | | |
| --- | --- | --- | --- | --- |
| | | At 100 ppm dosage | At 150 ppm dosage | At 200 ppm dosage |
| None | ULSD | | 0 | |
| Example 9 | ULSD | 25 | 35 | 45 |
| Example 10 | ULSD | 15 | 20 | 35 |
| example 11 | ULSD | 110 | 125 | 135 |
| Example 12 | ULSD | 105 | 130 | 150 |
| Example 13 | ULSD | 215 | 230 | 255 |
| Example 14 | ULSD | 510 | 545 | 580 |
| Example 15 | ULSD | 450 | 485 | 580 |
| Example 16 | ULSD | 550 | 585 | 620 |
| Example 17 | ULSD | 113 | 125 | 135 |
| Example 18 | ULSD | 105 | 115 | 125 |

The results of conductivity test of ULSD fuel without additive formulations showed no conductivity. After addition of the developed additive formulations Candidates 9 to 18 in ULSD fuel has improved the conductivity of the diesel fuel at different dosages. The prepared additive formulations Candidate 9 to 18 have proved the enormous effect on static dissipation in ULSD fuel which improved the conductivity of the fuel.

The developed additive formulation Candidate 12 doped in ULSD fuel has increased the conductivity of ULS diesel fuel at 100 ppm dosage to 105 pS/m from 0 pS/m. It was also observed that the conductivity of the diesel is increasing with increasing of the additive formulation Candidate 12 in ULSD fuel from 105 pS/m to 130 pS/m and 150 at dosages 150 ppm to 200 ppm respectively.

Similar observation was found in case of prepared additive formulations from Candidates 9 to 18. The conductivity of Candidate 13 doped ULSD fuel is 215 pS/m at 100 ppm dosage and reached to 255 pS/m at 200 ppm dosage whereas conductivity of Candidate 15 doped ULSD fuel is 450 pS/m at 100 ppm dosage and reached to 580 pS/m at 200 ppm dosage in ULSD fuel (Table 3).

The improvement of conductivity and lubricity of ULSD fuel after blended with Candidate 9 to 18 at dosage of 150 to 200 ppm was observed. The ratio of the components added in these additive formulations was well tuned to meet the requirement of lubricity and conductivity in ULSD fuel.

With above results of conductivity and lubricity performance, the developed additive packages are very stable and more effective for improving both lubricity and conductivity of ULSD fuels at required dosages.

Consistency of Performance of Developed Additive Formulations in ULSD Fuel:

It is important to evaluate the stability and performance of developed additive packages blended in ULSD fuel with respect to time for establishing potential of additive package for commercial application.

Performance study with developed additive formulation Candidate 12 at 200 ppm dosage was carried out in ULSD for five months. The results were displayed in the FIG. 1.

Above study reveals that the developed additive packages are stable and has potential to maintain the conductivity of the blended ULSD fuels for five months and more. The ULSD fuel blended with Candidate 12 at 200 ppm dosage has initial conductivity of 150 pS/m and observed slight dropping of conductivity of doped ULSD fuel with respect to time and maintaining the required conductivity of the fuel.

No-Harm Tests for ULSD Fuel Properties:

The standard tests pertaining to physical properties, distillation properties, corrosion properties, water tolerance and other important properties of ULSD fuel before and after blending of developed lubricity cum antistatic additive packages were examined as per ASTM test methods. The results showed that the properties of ULSD fuel before and after blending of developed additive package are maintain the in the range of standard specification of ULSD fuel as IS 1460:2018.

The invention claimed is:

1. A reaction product of:
   a fatty acid composition in the range of 60-95% wt/wt;
   a glycerol tricarboxylate in the range of 0.1-10.0% wt/wt;
   a polysulfone in the range of 0.1-5.0% wt/wt;
   a polyamine in the range of 0.1-5.0% wt/wt;
   an alkylated benzene sulfonic acid in the range of 0.1-5.0% wt/wt; and
   a phenol derivative in the range of 0.1-10.0% wt/wt.

2. The reaction product as claimed in claim 1, wherein the fatty acid composition is a mixture of fatty acids having carbon atoms in the range of $C_{12}$-$C_{24}$, wherein the mixture of fatty acids comprises a fatty acid selected from a group consisting of lauric acid, stearic acid, oleic acid, linoleic acid, myristoleic acid, behenic acid and arachidonic acid.

3. The reaction product as claimed in claim 1, wherein the glycerol tricarboxylate is prepared by reacting glycerol with fatty acid, and the fatty acid is selected from a group consisting of lauric acid, palmitic acid, linoleic acid, ricinoleic acid, and any mixture thereof.

4. The reaction product as claimed in claim 1, wherein the polysulfone is a reaction product of 1-alkene and $SO_2$ in the ratio of 1:1, and having molecular weight 10000-100000 gm/mole measured by gel permeation chromatography (GPC).

5. The reaction product as claimed in claim 1, wherein the polyamine is a condensed product of an epichlorohydrin and an alkylamine, wherein the alkylamine is having carbon atoms in the range of $C_{12}$ to $C_{18}$.

6. The reaction product as claimed in claim 1, wherein the alkylated benzene sulfonic acid is a mixture of linear, iso and tertiary alkyl groups of carbon atom ranging from $C_{10}$-$C_{18}$.

7. The reaction product as claimed in claim 1, wherein the phenol derivative having Formula-I:

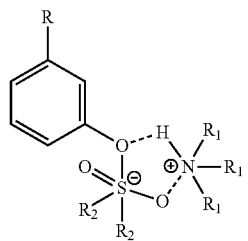

Formula I wherein,

R=alkyl or alkenyl group having carbon chain length of $C_{15}$-$C_{20}$;

$R_1$=alkyl or alkenyl group having carbon chain length of $C_{12}$-$C_{18}$; and $R_2$=alkyl or alkenyl group having carbon chain length of $C_5$-$C_{12}$.

8. A process for the preparation of a reaction product, comprising the steps of:
  i) stirring a fatty acid composition containing a mixture of fatty acids of carbon atoms $C_{12-24}$ in the range of 60-95% wt/wt at 25-30° C.;
  ii) adding a glycerol carboxylate in the range of 1.0-10.0% wt/wt at 25° C.-30° C. in 30 minutes under continuous stirring;
  iii) adding phenol derivative compound in the range of 1.0-10.0% wt/wt at 25-30° C. under continuous stirring and continue the stirring for another 20 minutes;
  iv) heating the above reaction mixture at 50° C. and stirring continued for one hour;
  v) adding a mixture of polysulfone in the range of 0.1-5.0% wt/wt, polyamine mixture in the range of 0.1-5.0% wt/wt, and alkylated benzene sulfonic acid in the range of 0.1-5.0% wt/wt, prepared in diluent in the range of 0.5-5.0% wt/wt to the reaction mass obtained in step iv);
  vi) heating and stirring the mixture obtained after step v) at 50° C. to obtain the reaction product.

9. The process as claimed in claim 8, wherein the fatty acid composition is a mixture of fatty acids having carbon atoms in the range of $C_{12}$-$C_{24}$, wherein the mixture of fatty acids comprises a fatty acid selected from a group consisting of lauric acid, stearic acid, oleic acid, linoleic acid, myristoleic acid, behenic acid and arachidonic acid.

10. The process as claimed in claim 8, wherein the glycerol tricarboxylate is prepared by reacting glycerol with fatty acid, and the fatty acid is selected from a group consisting of lauric acid, palmitic acid, linoleic acid, ricinoleic acid, and any mixture thereof.

11. The process as claimed in claim 8, wherein the phenol derivative having Formula-I:

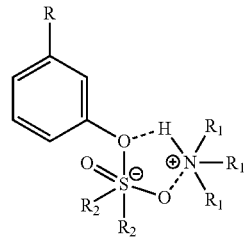

Formula I wherein,

R=alkyl or alkenyl group having carbon chain length of $C_{15}$-$C_{20}$;

$R_1$=alkyl or alkenyl group having carbon chain length of $C_{12}$-$C_{18}$; and $R_2$=alkyl or alkenyl group having carbon chain length of $C_8$-$C_{12}$.

12. The process as claimed in claim 8, wherein the polysulfone is a reaction product of 1-alkene and $SO_2$ in the ratio of 1:1, and having molecular weight 10000-100000 gm/mole measured by gel permeation chromatography (GPC).

13. The process as claimed in claim 8, wherein the polyamine is a condensed product of an epichlorohydrin and an alkylamine, wherein the alkylamine is having carbon atoms in the range of $C_{12}$ to $C_{18}$.

14. The process as claimed in claim 8, wherein the alkylated benzene sulfonic acid is a mixture of linear, iso and tertiary alkyl groups of carbon atom ranging from $C_{10}$-$C_{18}$.

15. The process as claimed in claim 8, wherein the diluent is a selective product of refinery obtained from pre-fractionated bottom stream having flash point more than 60° C.

* * * * *